(12) United States Patent
Desmet

(10) Patent No.: US 12,259,294 B2
(45) Date of Patent: Mar. 25, 2025

(54) DEVICE FOR APPLYING VIBRATIONS TO PASSENGER CARS

(71) Applicant: BEP EUROPE N.V., Bruges (BE)

(72) Inventor: Yves Jeroom André Desmet, Assebroek (BE)

(73) Assignee: BEP EUROPE N.V., Bruges (BE)

( * ) Notice: Subject to any disclaimer, the term of this patent is extended or adjusted under 35 U.S.C. 154(b) by 224 days.

(21) Appl. No.: 17/791,281

(22) PCT Filed: Jan. 7, 2021

(86) PCT No.: PCT/IB2021/050091
§ 371 (c)(1),
(2) Date: Jul. 7, 2022

(87) PCT Pub. No.: WO2021/140458
PCT Pub. Date: Jul. 15, 2021

(65) Prior Publication Data
US 2023/0031582 A1    Feb. 2, 2023

(30) Foreign Application Priority Data
Jan. 10, 2020 (BE) .................................. 2020/5017

(51) Int. Cl.
*G01M 17/007*    (2006.01)
*G01M 7/02*    (2006.01)

(52) U.S. Cl.
CPC .......... *G01M 17/0074* (2013.01); *G01M 7/02* (2013.01)

(58) Field of Classification Search
CPC ..................... G01M 17/00–06; G01M 7/00–02
See application file for complete search history.

(56) References Cited

U.S. PATENT DOCUMENTS

| | | | | |
|---|---|---|---|---|
| 2,709,362 A * | 5/1955 | Marcus | ............... | G01M 17/045 73/123 |
| 4,953,391 A * | 9/1990 | Schober | ............ | G01M 17/0074 73/118.01 |
| 8,171,782 B2 * | 5/2012 | Strobel | ............. | G01M 17/0074 73/116.06 |

FOREIGN PATENT DOCUMENTS

| | | | | |
|---|---|---|---|---|
| CN | 110243609 A * | 1/2021 | ............... | G01H 1/12 |
| DE | 20206515 U1 | 9/2003 | | |
| DE | 102004002506 A1 | 8/2005 | | |
| EP | 0299217 A2 * | 1/1989 | .............. | G01M 7/04 |

(Continued)

OTHER PUBLICATIONS

Machine Translation of CN-110243609-A (Year: 2021).*

(Continued)

*Primary Examiner* — Nguyen Q. Ha
(74) *Attorney, Agent, or Firm* — KDW Firm PLLC

(57) ABSTRACT

A device for applying vibrations to passenger cars has a platform with a roller on which a front or rear pair of wheels of the passenger car can be positioned. The roller has for each wheel positioned thereon at least two tracks with a different relief. In a first position the passenger car is located with the wheels on a first pair of the tracks and in a second position is located with the wheels on another pair of the tracks so that by rotating the rollers under the wheels vibrations are applied to the passenger car by the relief of the roller. Each track has a width greater than a greatest of the different wheel widths. There is a distance between each of the first and second pair of the tracks which is substantially equal to a greatest of the different track widths.

8 Claims, 3 Drawing Sheets

(56) References Cited

FOREIGN PATENT DOCUMENTS

| EP | 1253416 B1 | * | 8/2012 | ........ G01M 17/0074 |
|---|---|---|---|---|
| FR | 441006 A | | 7/1912 | |
| GB | 2309784 A | * | 8/1997 | ........ G01M 17/0072 |
| JP | H0236331 A | | 2/1990 | |
| JP | H02135842 U | | 11/1990 | |
| JP | H0329834 A | * | 2/1991 | |
| JP | 2017009545 A | * | 1/2017 | .......... G01M 17/007 |
| WO | WO-0186245 A1 | * | 11/2001 | ........ G01M 17/0072 |

OTHER PUBLICATIONS

Machine Translation of EP-0299217-A2 (Year: 1989).*
Machine Translation of EP-1253416-B1 (Year: 2012).*
Machine Translation of WO-0186245-A1 (Year: 2001).*
Machine Tranbslation of JP-2017009545-A (Year: 2017).*
Machine Translation of JP-H0329834-A (Year: 1991).*
International Search Report and Written Opinion for PCT/IB2021/050091 dated Mar. 4, 2021 (nine (9) pages).
Cars Garage [online source], "Volkswagen Golf Variant Production," YouTube, uploaded Apr. 16, 2015, 1 page, URL: https://www.youtube.com/watch?v=PYiMBWLpuZM.
Götze, J. [online source], "Valarravette: Corvette C6 Kit car EP. This sports car has 405 reartires", Autobildde, 12 pages (Translation Included), published Dec. 28, 2019, retrieved Dec. 24, 2024 ; URL: https://www.autobild.de/artikel/valarravette-corvette-c6-kitcar-16106275.html.
Audi AG, "AB/83," Nov. 2018, p. 104-105 (No Translation Available).

* cited by examiner

DEVICE FOR APPLYING VIBRATIONS TO PASSENGER CARS

This application is a national stage filing under 35 U.S.C. 371 of International Application No. PCT/IB2021/050091, filed Jan. 7, 2021, which claims priority to Belgium Patent Application No. BE2020/5017, filed Jan. 10, 2020, the entirety of which applications are incorporated by reference herein.

The invention relates to a device for applying vibrations to passenger cars.

When testing passenger car prototypes and/or when tuning and/or improving passenger cars that are in production, these cars are tested for vibration. More specifically, the cars are placed on a device, wherein the passenger cars are located with at least two wheels, the front wheels and/or the rear wheels, on rollers. The rollers have a surface relief in order to generate a predetermined vibration when they turn under the wheels. A surface relief can for instance be created in order to imitate a predetermined ground surface, such as cobblestones. When the passenger car is placed with its wheels on the rollers, and the wheels and rollers rotate, a vibration is applied to the car by the surface relief. This vibration corresponds with a vibration of the passenger car when travelling along the predetermined ground surface. Such a device is known in practice as a so-called rattle machine.

The rollers typically have a plurality of tracks. Each track has its own relief. Each relief corresponds with a different type of ground surface. By providing each roller with a plurality of tracks, for instance a left-hand track and a right-hand track with a different relief, the passenger car can first be placed to the left on the device in order to test the passenger car on the left-hand relief, and the passenger car can then be moved to the right-hand track so as to be tested on the right-hand relief. Lateral displacement of the vehicle on the device is simple when the rollers and the wheels are turning. This allows the vehicle to be tested for different types of ground surface on one device. By varying the rotation speed of the rollers and selecting the relief of different tracks a passenger car can be tested for different kinds, types and frequencies of vibration.

It is an object of the invention to improve the device for applying vibrations to passenger cars so that the device can be used for passenger cars with different track widths and different wheel widths.

The invention provides for this purpose a device for applying vibrations to passenger cars with different track widths and different wheel widths, which device has a platform on which the passenger car can be placed, wherein the platform has at least one roller on which a front or rear pair of wheels of the passenger car can be positioned, wherein the at least one roller has thereon at least two pairs of tracks with different relieves, such that in a first position on the device the passenger car is placed with the wheels on a first pair of the tracks and in a second position on the device is placed with the wheels on a second pair of the tracks and so that, by rotating the at least one rollers under the wheels, vibrations are applied to the passenger car by the relieves of the at least one roller, wherein each track has a width which is greater than a greatest of different wheel widths of different passenger cars, and wherein an outer distance of each pair of tracks, which span between respective outer sides of each pair of tracks, is substantially equal to a greatest of different track widths of different passenger cars.

Provided in the device according to the invention is at least one roller on which a front pair of wheels or a rear pair of wheels of the passenger car can be positioned. Two wheels of the passenger car are located on the at least one roller during operation of the device when testing passenger car. The at least one roller has at least two pairs of tracks for each of the two wheels. Each track is provided at the position of its surface with a relief in order to imitate or simulate a predetermined ground surface. The tracks for the left wheel and the tracks for the right wheel correspond. Thus, in a first position the vehicle can be located on the at least one roller such that the two wheels are located on the corresponding first tracks and in the second position the two wheels are located on the second tracks. When testing the passenger car, this allows a first test to be performed wherein the vehicle is in the first position, and vibrations are applied by the first relief, and wherein, by a simple repositioning on the rollers, the vehicle can be tested on the same device for vibrations which are applied by the second relief.

The invention is based on the insight that when the track width on the roller is considerably greater than the wheel width, and the distance measured on the outer sides of corresponding tracks is equal to the greatest track width, it is not necessary, or at least less necessary, to displace the left-hand and right-hand tracks relative to each other. In practice such devices were typically developed and optimized for one type of passenger car. One type of passenger car has only one wheel width, or at least a highly limited wheel width range. One type of car can also typically be supplied with a limited number of different wheel widths. The wheelbase for one type of passenger car is also fixed and predetermined. In known machines the width of the tracks on the rollers is therefore typically adapted to the wheel width. The distance between the tracks is adapted to the distance between the wheels of the passenger car. In such a device it is necessary to change the distance between the left-hand tracks and the right-hand tracks when a passenger car with a different track width must be tested.

Changing the distance between the left-hand tracks and the right-hand tracks is not necessary in the device according to the invention. Because the width of the tracks is considerably greater than the greatest wheel width and because the distance between the left-hand track and the right-hand track, measured on the outer sides of each track, is equal to the greatest track width, it is also possible to test vehicles with a smaller track width. These proportions surprisingly allow vehicles with varied track widths and wheel widths to be tested on the same device, without the distance between the tracks having to be changed for this purpose. This will be further elucidated and illustrated in the extensive description.

The device is preferably further adapted to apply vibrations to passenger cars with different wheelbases, further comprising a second roller on which another of a front or rear pair of wheels of the passenger car can be positioned, wherein a distance between the roller and the second roller can be set so that the device is adjustable to the passenger cars with the different wheelbases. The second roller is preferably constructed just as the above described roller.

The second roller preferably has for each wheel positioned thereon at least two tracks with different relieves, such that in the first position the passenger car is placed with the wheels on corresponding first tracks and in the second position it is placed with the wheels on further corresponding tracks.

Each roller preferably has for each wheel of the passenger car three tracks each with a different relief, each track being positioned so as to be placed under the wheels in a predetermined position of the passenger car on the device.

The roller preferably has an integrally formed base body, and the base body is preferably provided with a peripheral casing on which at least four tracks are formed, these forming the at least two tracks for each wheel positioned thereon.

The second roller preferably has an integrally formed base body, and the base body is preferably provided with a peripheral casing on which at least four tracks are formed, these forming said at least two tracks for each wheel positioned thereon.

Each track preferably has a width greater than 400 mm, preferably greater than 425 mm, more preferably greater than 450 mm, most preferably about 475 mm.

The distance between corresponding tracks on a roller, measured on the outer sides of each track, is preferably smaller than 2200 mm, preferably smaller than 2100 mm, and greater than 1500 mm, preferably greater than 1600 mm, most preferably about 1800 mm.

The device preferably further comprises a tilting mechanism for tilting the roller relative to the platform. The first roller can particularly be tilted in clockwise direction while the second roller is tilted in anticlockwise direction, so that a torque can be applied to the passenger car during application of vibrations.

The invention will now be further described on the basis of an exemplary embodiment shown in the drawing.

In the drawing.

The same or similar elements are designated in the drawing with the same reference numeral.

In the context of this description the word passenger car is broadly defined as a vehicle on four wheels, in which at least one person can take up position. A passenger car is preferably a vehicle with a weight higher than 500 kg, preferably higher than 1000 kg, more preferably higher than 1500 kg and with a weight lower than 5000 kg, preferably lower than 3500 kg, more preferably lower than 3000 kg. The passenger car is more properly configured to transport at least two people. Transport of cargo, as in a van, can be a secondary function. Transporting families, as in a family car, can alternatively be a function. As a further alternative, the function can be to travel over more tricky terrain, as in an off-road vehicle or SUV. As a further alternative, the function can be sporting performance, as in a sports car. In the context of this description the word passenger car will preferably preclude a truck and a work vehicle such as a forklift truck and tractor. In the further description a passenger car as defined above is understood when the word vehicle is used.

Figure 1:
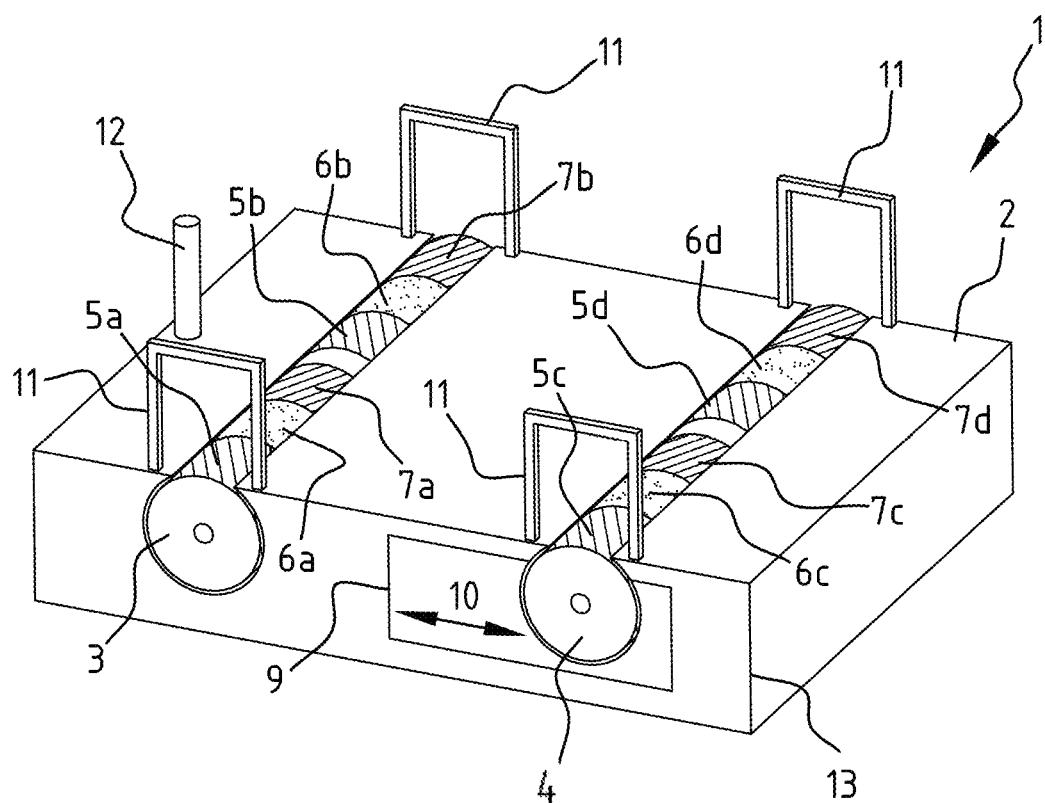
FIG. 1 shows a perspective view of a device according to a preferred embodiment of the invention.

FIG. 1 shows a perspective view of a device 1 according to a preferred embodiment of the invention. Device 1 has a platform 2. A passenger car can be placed on platform 2. Platform 2 forms a surface which need not necessarily extend continuously, but which must however cover the upper side of device 1 to sufficient extent to allow a passenger car to be placed on the device. The device of the embodiment of FIG. 1 comprises two rollers, a first roller 3 and a second roller 4. The two rollers 3 and 4 preferably take a substantially identical form. In some embodiments it will however be possible to give the two rollers different forms. In a further embodiment only one roller is provided, i.e. only the first roller 3 or only the second roller 4 will be provided. When two rollers 3 and 4 are provided, a passenger car can be placed with its front wheels on the first roller and with its rear wheels on the second roller in order to thus apply vibrations to the passenger car via the four wheels at the same time. When only one roller is provided, it will only be possible to apply vibrations to two wheels at the same time, the front wheels or the rear wheels, depending on which are placed on the one roller.

The object of device 1 is to apply vibrations to the wheels of a passenger vehicle. Device 1 is preferably intended to simulate driving on predetermined types of ground surface. For this purpose each of the rollers 3 and 4 are provided at the position of their surface with a predetermined relief. In the shown embodiment each roller 3 and 4 has three tracks for each wheel placed thereon. The first track is designated with reference numeral 5, the second track is designated with reference numeral 6 and the third track is designated with reference numeral 7. The tracks are positioned in device 1 such that a vehicle which is in a first position is located on corresponding first tracks 5. In the shown embodiment the vehicle will in the far left position be located with its left front wheel on track 5a, with its right front wheel on track 5b, with its left rear wheel on track 5c and with its right rear wheel on track 5d. When the passenger car is located centrally on the device, the wheels will similarly be located on tracks 6a, 6b, 6c and 6d. When the vehicle is positioned to the right on the device, the wheels will be supported by tracks 7a, 7b, 7c and 7d. By providing different tracks 5, 6 and 7 with a different surface relief different vibrations can be applied to the vehicle at different positions on device 1. This allows extensive testing of the vehicle for different ground surfaces and speeds in simple manner.

On the basis of the function and the objective of device 1 the skilled person will appreciate that device 1 has a longitudinal direction and that rollers 3 and 4 extend transversely relative to the longitudinal direction. Platform 2 is supported by a frame 8. First roller 3 is preferably connected fixedly to frame 8. A second roller 4 is preferably connected to frame 8 via a sub-frame 9 which is displaceable relative to frame 8. This displacement is indicated with arrow 10. The distance between first roller 3 and second roller 4 can be adjusted via the sub-frame 9. This distance can be chosen in accordance with the wheelbase, such that the front wheels can be located on first roller 3 and the rear wheels on second roller 4. Alternatively, the distance can be chosen so as to position the front wheels separately or the rear wheels separately on a roller 3 or 4. These different options increase the flexibility of device 1. The skilled person will appreciate that, in a further embodiment, first roller 3 can be displaceable relative to frame 8 while second roller 4 is mounted fixedly relative to frame 8, or that both rollers 3 and 4 are displaceable.

For safety reasons railings 11 are preferably provided at the position of the lateral edges of device 1. Railings 11 function as guard rail and will prevent a vehicle situated on device 1 from accidentally ending up laterally adjacently of the device. A stop 12 is further preferably provided on the front side of the device. Stop 12 is preferably removable, for instance taking the form of a post which can slide upward and downward relative to platform 2. The post can thus be slid downward when a vehicle may leave platform 2 via the front side and be slid upward during testing of a passenger car in order to prevent the passenger car from accidentally moving off device 1 in forward direction.

On the basis of the objective the skilled person will further appreciate that rollers 3 and 4 comprise a drive for driving the rollers at a predetermined number of revolutions. The drive of rollers 3 and 4 is preferably synchronized with the drive of the wheels of the passenger vehicle, mechanically, pneumatically, electrically or electronically, so that the vehicle remains on the rollers during turning of the rollers. Vehicle 3 can for instance be secured on the device such that a forward and rearward movement of the bodywork of the vehicle is prevented. By driving the rollers the wheels will then automatically rotate synchronously. Alternatively, the drive of the vehicle can be operatively coupled to the drive of the rollers in order to enable a synchronous rotation. As a further alternative, additional rollers can be placed in front of and/or behind the wheels in order to prevent the vehicle from moving forward and/or rearward.

Figure 2:
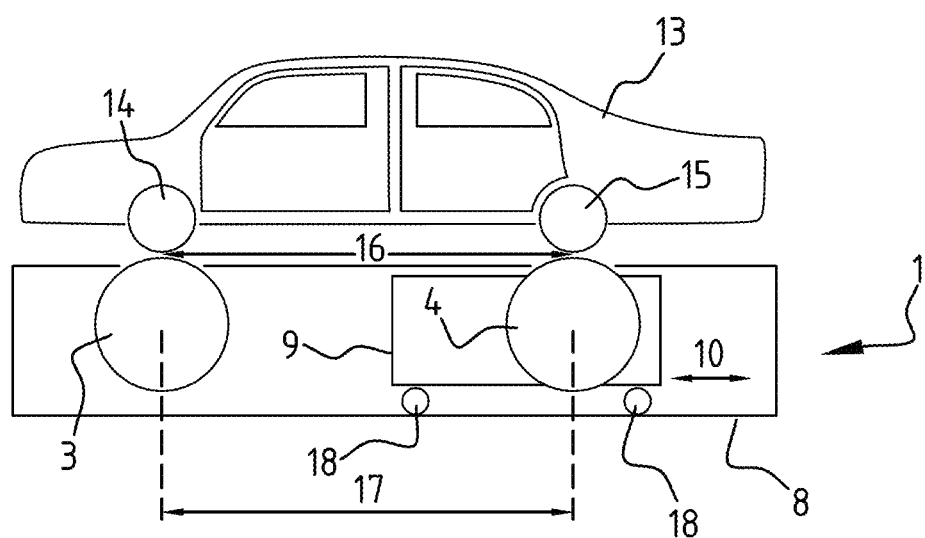
FIG. 2 shows a schematic side view of a device according to a preferred embodiment of the invention in use.

FIG. 2 shows a side view of a device according to the invention. FIG. 2 shows here a passenger car 13 which is situated on the device. Passenger car 13 has front wheels 14 and rear wheels 15. Front wheels 14 are both placed on first roller 3 and rear wheels 15 are both placed on second roller 4. The distance between front wheels 14 and rear wheels 15 is referred to as the wheelbase 16. Different kinds and/or types of passenger car 13 typically have different wheelbases 16. Because sub-frame 9 can move 10 relative to frame 8, the distance 17 between the first and the second roller is adjustable. Distance 17 is preferably chosen to be the same as the wheelbase 16 of the passenger car being tested on the device. For this purpose sub-frame 9 is typically connected via guides 18 to frame 8. Second roller 4 is held, i.e. mounted and driven, in sub-frame 9 and thereby indirectly in frame 8. First roller 3 is held, i.e. mounted and driven, directly in frame 8. On the basis of FIG. 2 a skilled person will be able to appreciate how device 1 can be adjusted to passenger cars 13 with different wheelbases 16.

FIG. 3 shows a passenger vehicle 13 in rear view and shows a roller 3 or 4. The figure shows that vehicle 13 has a wheel width 19. The wheel width of the front wheels is not necessarily the same as the wheel width of the rear wheels. In the figures the wheel width is designated with reference numeral 19. The figure further shows the track width 20 of vehicle 13. The track width is defined as the distance between the outer sides of the wheels of vehicle 13. In other words, the track width 20 is the distance between the left-hand side of the left wheel and the right-hand side of the right wheel, as shown in FIG. 3. The track width 20 is not necessarily identical between the front wheels and the rear wheels of a vehicle 13.

Figure 3A:
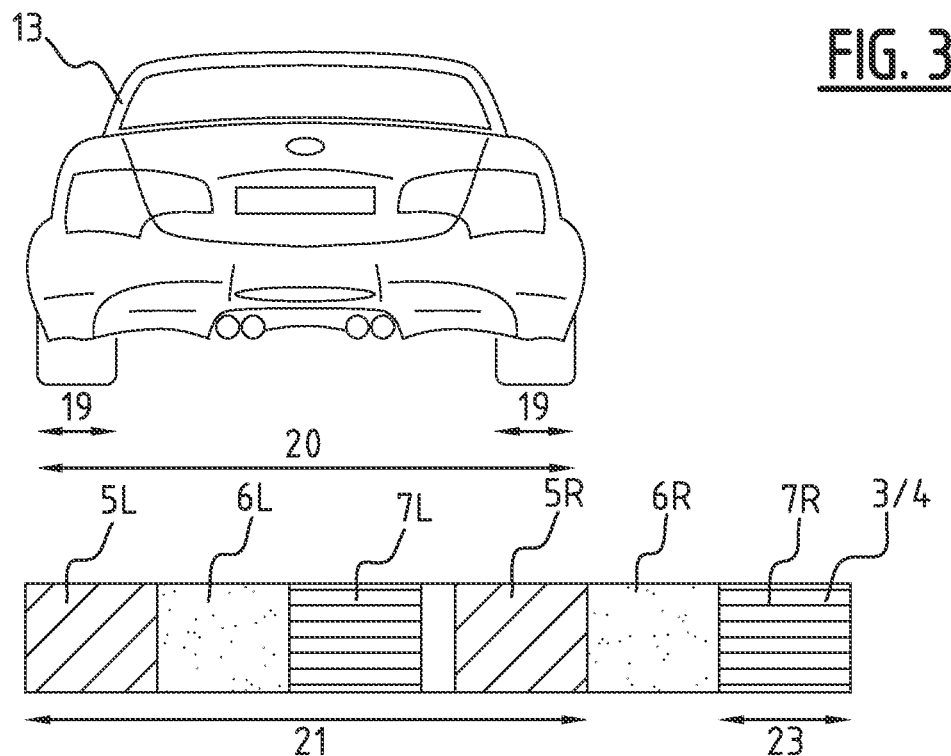
FIG. 3 shows a roller of the device according to the invention and a passenger vehicle in multiple positions relative to the roller.
Figure 3B:
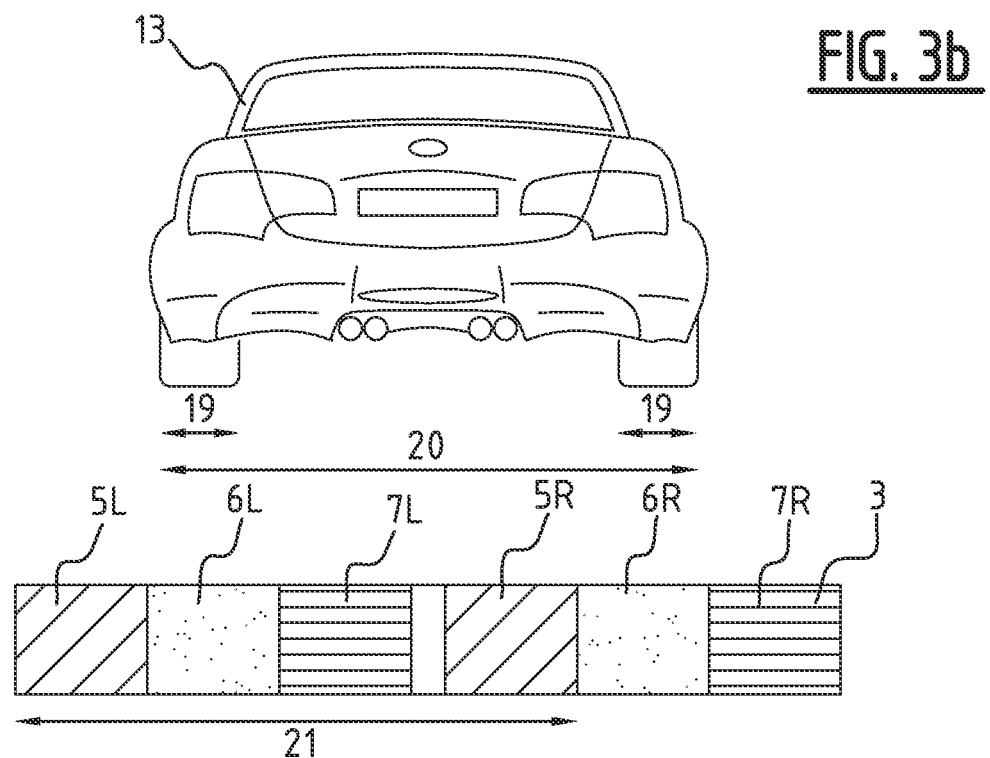
Figure 3C:
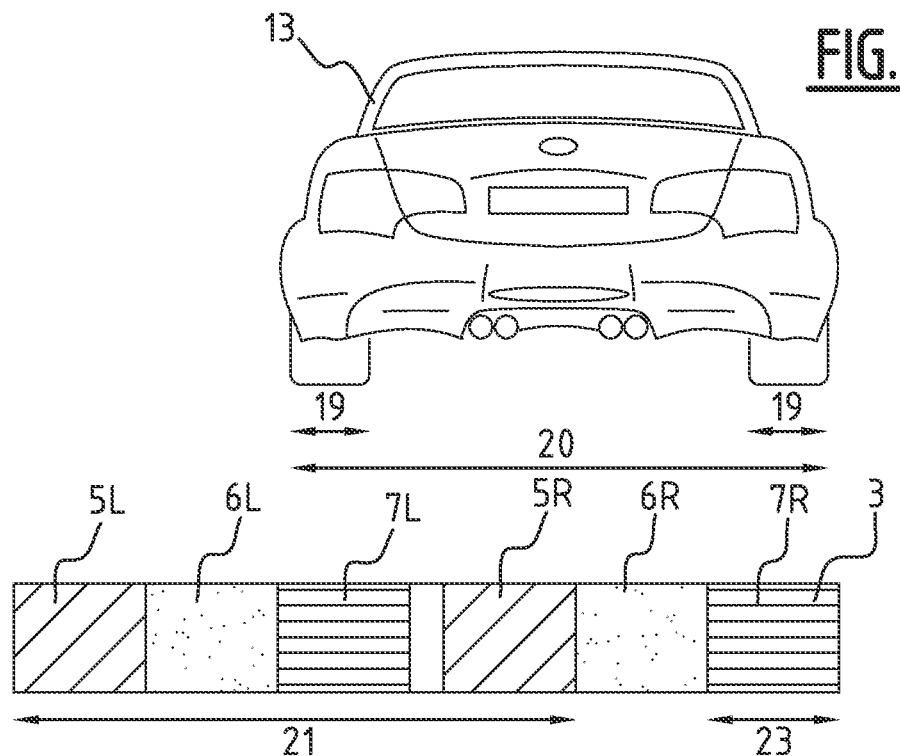

FIG. 3A further shows roller 3 or 4 in a realistic proportion relative to vehicle 13. Each roller 3 and 4 is provided for the purpose of supporting two wheels of the vehicle 13. Roller 3, 4 has a plurality of segments for each of the two wheels. The figure shows a first segment 5L for the left wheel and a first segment 5R for the right wheel, a second segment 6L for the left wheel and a second segment 6R for the right wheel, and a third segment 7L for the left wheel and a third segment 7R for the right wheel. In FIG. 3A vehicle 13 is positioned relative to rollers 3 and 4 in a first position wherein all wheels are located wholly on the first tracks 5. In FIG. 3B the same vehicle 13 is positioned on the same rollers 3 and 4 in a second position, wherein all wheels are located on second tracks 6. In FIG. 3C the same vehicle is positioned on the same rollers in a third position, wherein all wheels are located on third tracks 7. The first position corresponds to a left-hand position, the second position with a central position and the third position with a right-hand position.

FIG. 3 shows that the width 23 of one track is considerably greater than the wheel width 19 of vehicle 13. The distance between corresponding tracks, measured on the outer side of the tracks, is designated in the figures with reference numeral 21. This distance 21 is preferably substantially the same as the track width of the vehicle with the greatest track width 20 which must be tested on rollers 3 and 4. In the figures only one distance 21 is shown, between track 5L and corresponding track 5R. The distance between corresponding tracks 6L and 6R and between corresponding tracks 7L and 7R is determined in similar manner and is preferably substantially identical to the shown distance 21. The width of one track 23 is also designated only for track 7R. All tracks preferably have substantially the same width.

Figure 4:
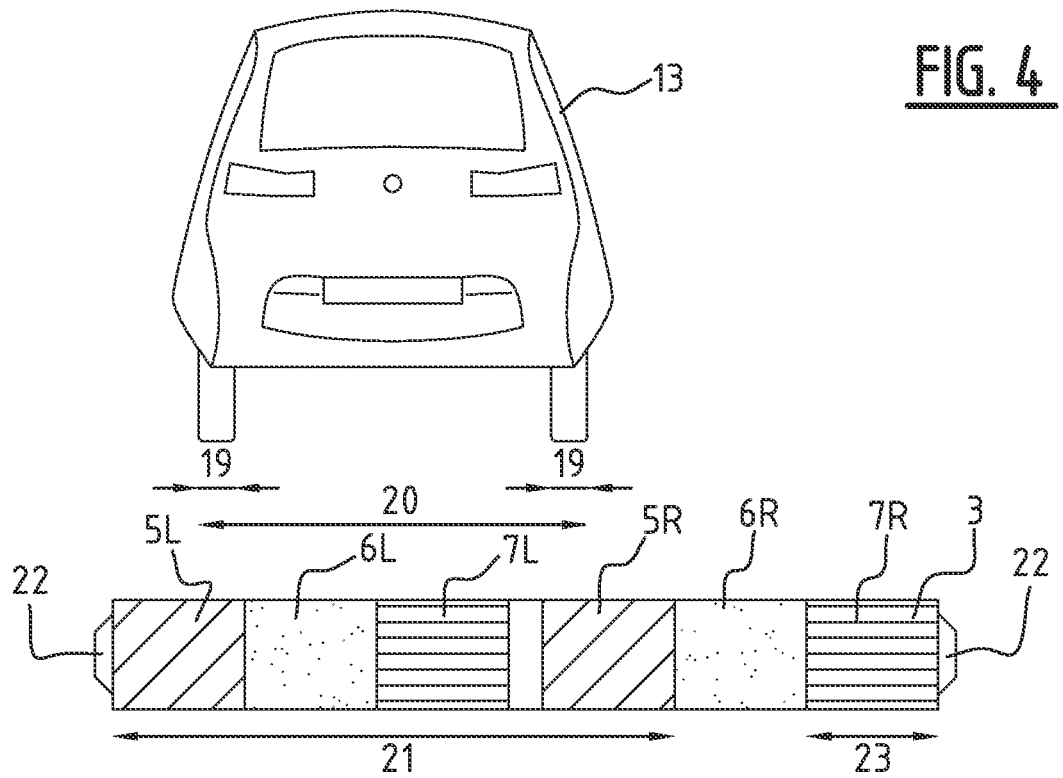
FIG. 4 shows a roller of the device according to the invention and another passenger vehicle.

FIG. 4 shows how a different vehicle 13 can be tested on the same rollers 3, 4. The other vehicle 13 of FIG. 4 has a considerably smaller wheel width 19 and a considerably smaller track width 20 than the vehicle 13 of FIG. 3. Because the width of tracks 5, 6, 7 is considerably greater than the wheel width of the vehicle of FIG. 3, the vehicle 13 of FIG. 4 with a narrower track width 20 can still be placed with its wheels wholly on the first track 5L, 5R. More specifically, vehicle 13 of FIG. 4 can be located with its wheels wholly on each track in respective positions. The figure illustrates that it is not necessary to displace or shift left-hand tracks 5L, 6L, 7L relative to right-hand tracks 5R, 6R, 7R in order to make vehicle 13 of FIG. 4 fit. This considerably simplifies the construction of the device 1 according to the invention.

The specific choices in respect of the width 23 of tracks 5, 6, 7 and the distance between corresponding tracks 21 are not typical because most vehicles will not be located with their wheel centrally on track 5, 6, 7. Tests have shown that this is however not a drawback. It is precisely because wheels are not located centrally on tracks 5, 6, 7 that it becomes possible to test vehicles with different wheel widths and with different track widths on one set roller. The vehicle as shown in FIG. 3 will thus more likely be located on the tracks of the roller on the outer side. The vehicle of FIG. 4 will more likely be located on the tracks of the roller on the inner side.

Because two wheels are in each case placed thereon, each roller 3, 4 has two segments. A left-hand segment of the roller comprises the left-hand tracks. The right-hand segment of the roller comprises the right-hand tracks. In the figure the left-hand segment comprises tracks 5L, 6L and 7L. The right-hand segment comprises tracks 5R, 6R and 7R. The roller is preferably formed integrally. This has the result that the roller can be mounted and connected to frame 8 at its outer ends. The bearing is shown schematically in FIG. 4 and designated with reference numeral 22. For this purpose the roller preferably has a fixed base body, for instance a fixed central shaft. Flanges, to which the outer surface can be attached, can be mounted on this shaft. The outer surface forms the surface of the roller. At the position of the surface of the roller, the roller can be provided with attachments or external elements which form the relief. Because the roller 3, 4 is formed integrally, the distance between the left-hand segment and the right-hand segment can be minimal. The distance is preferably smaller than 200 mm, more preferably smaller than 150 mm. This means that there is a minimal distance between the inner side of the inner track of the first segment, this being the right-hand side of track 7L in FIG.

4, and the inner side of the inner track of the second segment, this being the left-hand side of track 5R in FIG. 4. This is possible because the roller is formed integrally and therefore requires no support or bearing between the segments.

When vehicles of exceptionally widely varying wheel widths and track widths must be tested on rollers 3, 4, the rollers can also be provided with only two tracks per wheel placed thereon. Providing only two tracks increases the operating range of device 1, more specifically the difference between the smallest testable track width and the greatest test will track width.

The skilled person will appreciate on the basis of the above description that the invention can be embodied in different ways and on the basis of different principles. The invention is not limited to the above described embodiments. The above described embodiments and the figures are purely illustrative and serve only to increase understanding of the invention. The invention will not therefore be limited to the embodiments described herein, but is defined in the claims.

The invention claimed is:

1. A device for applying vibrations to passenger cars with different track widths and different wheel widths, the device comprising:
   a platform on which a passenger car can be placed, wherein the platform has at least one roller on which a front or rear pair of wheels of the passenger car can be positioned,
   wherein the at least one roller has thereon at least two pairs of tracks with different relieves, such that in a first position the passenger car is placed with the pair of wheels on a first pair of the tracks and in a second position the passenger car is placed with the same pair of wheels on a second pair of the tracks and such that by rotating the at least one roller under the wheels, vibrations are applied to the passenger car by the relieves of the at least one roller,
   wherein each track has a width which is greater than a greatest of different wheel widths of different passenger cars,
   wherein an outer distance of each pair of tracks, which span between respective outer sides of each pair of tracks, is substantially equal to a greatest of different track widths of different passenger cars; and
   wherein the device further comprises a tilting mechanism for tilting the at least one roller relative to the platform.

2. The device according to claim 1, adapted to apply vibrations to different passenger cars with different wheelbases, further comprising a second roller on which another of the front or rear pair of wheels of the passenger car can be positioned, wherein a center-to-center distance between the at least one roller and the second roller is adjustable to adapt to different passenger cars with different wheelbases.

3. The device according to claim 2, wherein the second roller has, for the pair of wheels positioned thereon, at least two corresponding pairs of tracks with different relieves, such that in the first position the passenger car is placed with the another of the front or rear pair of wheels on corresponding first pair of tracks and in the second position the passenger car is placed with the another of the front or rear pair of wheels on corresponding second tracks.

4. The device according to claim 3, wherein the second roller has an integrally formed base body and wherein the base body is provided with a peripheral casing on which at least four tracks are formed, these forming the at least two corresponding pairs of tracks.

5. The device according to claim 1, wherein each roller has three pairs of tracks with different relieves, each pair of tracks and each corresponding pair of tracks being positioned so as to be located under the wheels in a respective position of the passenger car on the device.

6. The device according to claim 1, wherein the at least one roller has an integrally formed base body and wherein the base body is provided with a peripheral casing on which at least four tracks are formed, these forming the at least two pair of tracks.

7. The device according to claim 1, wherein each track has a width greater than 400 mm.

8. The device according to claim 1, wherein the outer distance is greater than 1500 mm.

* * * * *